July 24, 1956   F. A. E. PORSCHE ET AL   2,756,067
INDEPENDENT WHEEL SUSPENSIONS FOR POWER DRIVEN VEHICLES
Filed Oct. 15, 1953   2 Sheets-Sheet 2

INVENTORS
Ferdinand A. E. Porsche
Ernst Fuhrmann
By Pennie, Edmonds, Morton, Barrows & Taylor
Attorneys United States Patent Office 2,756,067
Patented July 24, 1956

2,756,067

INDEPENDENT WHEEL SUSPENSIONS FOR POWER DRIVEN VEHICLES

Ferdinand A. E. Porsche, Stuttgart, and Ernst Fuhrmann, Stuttgart-Weil im Dorf, Germany, assignors to Dr. Ing. h. c. F. Porsche K.-G., Stuttgart-Zuffenhausen, Germany Application October 15, 1953, Serial No. 386,354

Claims priority, application Germany October 21, 1952

8 Claims. (Cl. 280—96.2)

This invention relates to improvements in independent wheel suspensions for the steerable wheels of motor vehicles, and more particularly to a suspension including two parallel links or control arms pivoted to the body of the vehicle and arranged to swing parallel to a vertical plane extending generally longitudinally of the vehicle, the suspension for each wheel being sprung by means of a helical spring.

Wheel suspensions are known of a kind in which the helical springs used for the wheel suspensions are hingedly connected to the top link, bar or suspension arm and extend vertically upwards with respect to the frame or are inserted between the links or suspension arms. One of the drawbacks of this type of suspension arrangement is that the supporting forces exerted by the springs act on the links or suspension arms, which consequently have to take up the whole of the transverse forces so that damage invariably occurs at the points of the joints of the suspension arms. In such constructions, in order to obtain sufficient lateral stability, the links or suspension arms must be kept as short as possible and at the same time they mut be very heavily constructed. Such constructions place limitations on the springing motion of the wheels.

The primary object of the present invention is to provide an improved wheel suspension in which the parts are so arranged that the suspension arms and other parts may be made relatively light.

A further object of the invention is to provide a wheel suspension structure in which the spring of the suspension is arranged in such a manner as to counter the transverse force of the wheels so that the suspension arms are required to take very little, if any, of the transverse forces.

A further object of the invention is to provide a wheel suspension which does not require complicated types of bearings which increase the cost of production.

In accordance with the invention, the drawbacks referred to above are overcome by locating the helical spring of the wheel suspension so that an extension of its longitudinal axis intersects a vertical line through the geometrical center of the wheel at a point located within a given distance from a horizontal plane passing through the attachment axis of the lower suspension arm, such distance being within the range of one-half of the distance between the axes of the suspension arms.

In this construction, the independent wheel suspension for each of the steerable wheels of the power driven vehicle include upper ad lower spaced longitudinally-extending suspension arms or links pivoted to the body of the vehicle and swingable parallel to a vertical plane extending generally longitudinally of the vehicle.

The relationship referred to above with respect to the angle of the helical springs is achieved by supporting the helical spring of each wheel suspension and the free ends of the links or suspension arms in such a manner that the axis of the swivel or king pin and the extended axis of the spring intersect at least approximately at the center point of the pivot axis of the free end of the upper link or suspension arm. This provides an arrangement which causes the supporting forces of the spring to act counter to the transverse forces of the wheel carried by the suspension, so that the suspension links or arms have to take up very small forces or none at all and, therefore, may be made of lighter structural parts.

In a preferred construction the free ends of the links or suspension arms are provided with pins carrying a ball cooperating with a socket to form a ball and socket joint bearing, the center points of the balls lying in the axis of the swivel or king pin of the suspension unit. In a modified form of construction the carrier pins for the arms can be supported on the king pin by means of resilient joint structures including rubber bushings which give rise to a simple and inexpensive form of bearing. The resilient members may be in the form of rubber sleeves tensioned in relation to each other, the center points of these bearings also lying in the axis of the swivel or king pin of the suspension.

The improved suspension construction also includes a bracket at the upper end of the king pin to which the helical spring and the end of the upper suspension arm are secured, this bracket at least in part providing a ball and socket or other bearing for the carrier pin or end of the suspension arm. The steering knuckle and support for the wheel are pivoted to the king pin or a steering knuckle and a thrust bearing is provided between the support and the bracket on the upper end of the king pin so that the resulting bearings forces are taken up by the thrust bearing. In this structure the helical spring is held in position by a sheet metal supporting means which forms the bearing point for a shock absorber located inside the helical spring and connected to the bracket at the upper end of the swivel or king pin.

One embodiment of the improved suspension of the present invention is shown in the accompanying drawings, in which.

Figure 1:
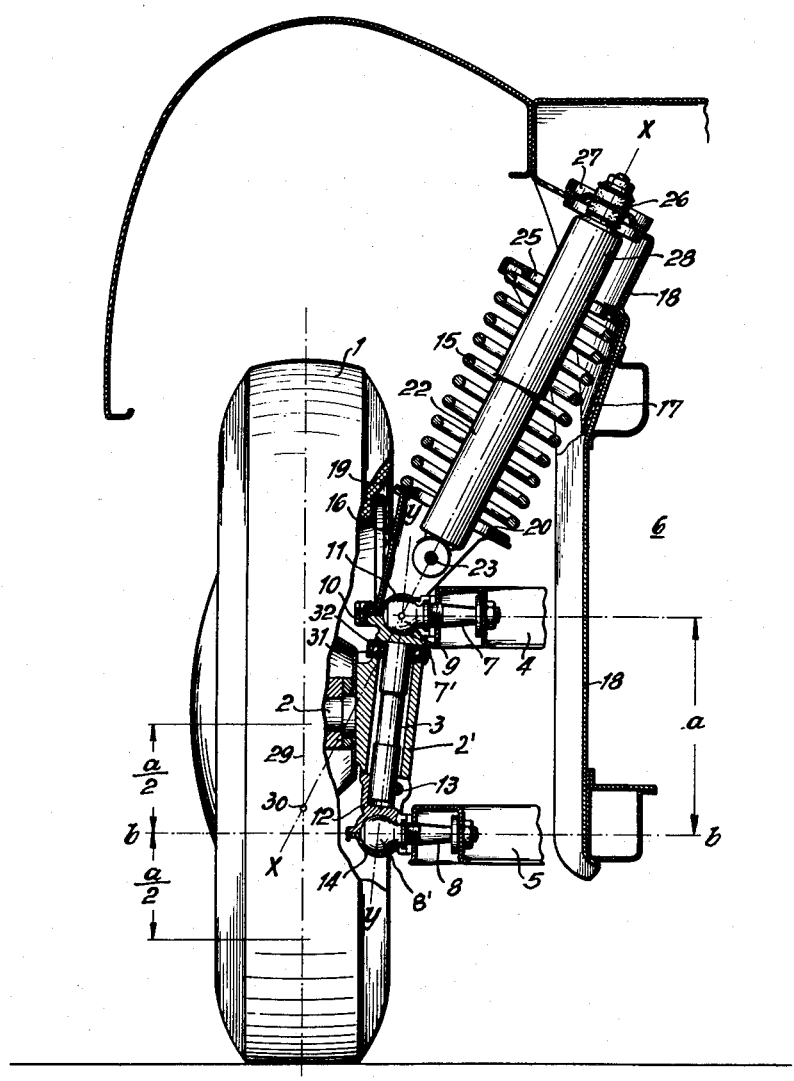
Fig. 1 is a broken front view partly in vertical section with parts broken away showing a wheel suspension according to the invention.
Figure 2:
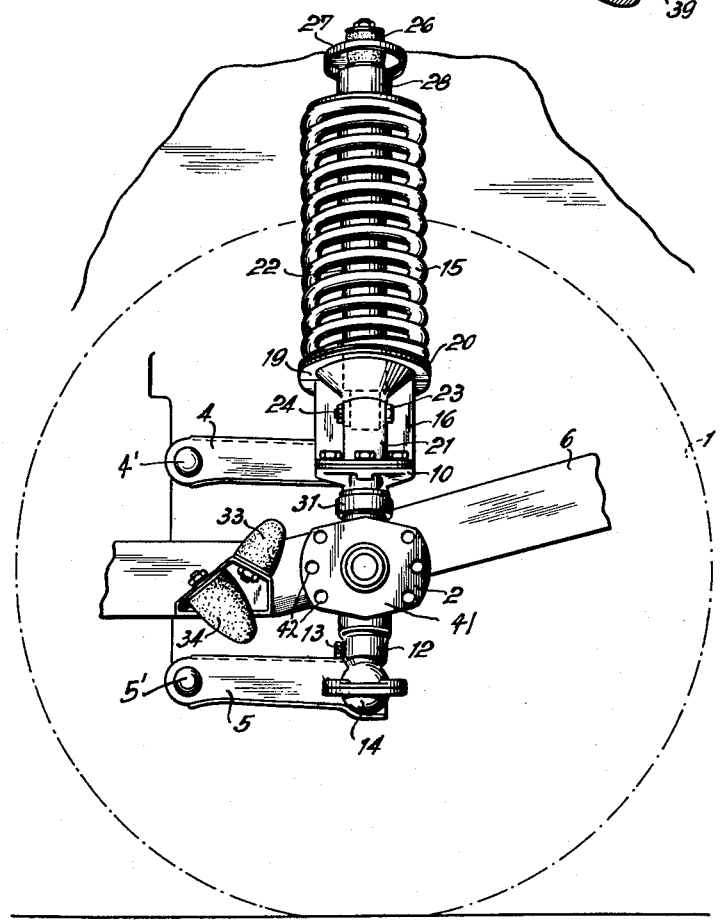
Fig. 2 is a fragmentary side view of the wheel suspension shown in Fig. 1 looking toward the body of the vehicle with the wheel removed.

Referring to Figs. 1 and 2 of the drawings which show one of the steerable wheels of a power-driven vehicle and the improved independent suspension associated therewith, it will be noted that the wheel 1 is rotatably mounted on a stub axle or spindle 2 carried by a steering knuckle support bearing 2' through which an upright swivel or king pin 3 extends. The wheel assembly is guided on the frame of the vehicle body 6 by means of parallel spaced longitudinally-extending links or suspension arms 4 and 5 positioned one above the other and respectively pivoted to the frame of the vehicle by means of pivot bolts 4' and 5', as shown in Fig. 2. The suspension arms 4 and 5 swing parallel to a vertical plane extending generally longitudinally of the vehicle. Both of the front wheels of the vehicle are carried by similar suspension mechanisms so that the suspension mechanism of only one wheel is shown and described herein, it being understood that the knuckle support bearings 2' are provided with means, not shown, for steering the front wheels of the vehicle.

The free ends of the links 4 and 5 are provided with carrier pins 7 and 8 having laterally extending ball type bearing heads 7' and 8' mounted in a bearing at the respective ends of the king pin 3. The upper end of the king pin 3 integrally includes or is made in the form of a bracket 10 having a semispherical or cup-shaped upper portion in which the ball 7′ is seated. An upper cup-shaped bearing member 11 completes the socket for the ball 7′, the member 11 being secured by studs or bolts to the outer flange portion of the bracket 10.

At the lower end of the king pin 3, the bearing ball 8′ rests inside a semispherical recess in a combined casing and bracket 12 connected to the lower end of the king pin 3 by means of a clamping bolt 13. The sleeve-like casing portion of the member 12 is split at the side of the bolt 13 so that the member may be clamped to the lower end portion of the king pin 3. The socket bearing for the ball 8′ is completed by means of a cup-shaped member 14 secured to the member 12.

The wheel 1, as shown in the drawings, is sprung by means of a helical spring 15 supported at its lower end by a support 16 attached with the bearing cap 11 to the bracket 10. At the upper end the spring 15 is secured to the vehicle body by means of a bracket 17 set in the lateral wall 18 of the body 6 of the vehicle. The support 16 consists of a pressed sheet of metal which at its upper end 19 is provided with an outwardly extending flange to which a spring seat 20 is welded for holding the lower end of the spring 15 in position. The support 16 extends from the spring seat 20 partly in the shape of a cone, as seen in Fig. 2, and includes a base portion 21 to which the lower end of a shock absorber 22 is fixed by means of a bolt 23 and a nut 24. The shock absorber is located on the inside of the spring 15 and extends axially therethrough and through an opening 25 in the bracket 17 which includes a spring seat for the upper part of the spring 15. The upper end 28 of the shock absorber 22 is movably mounted in the lateral wall 18 by means of rubber bearings or bushings 26 arranged on opposite sides of a reinforcing plate 27 welded or otherwise fixed to the wall 18.

The position and arrangement of the helical spring 15 has been so selected, according to the invention, that the extension of the axis $x$—$x$ of the spring intersects a vertical line or plane 29 passing through the geometrical center of the wheel, the intersection being at a point 30 lying on either side of a horizontal line or plane $b$—$b$ extending through the axis of the bearing 8′ of the lower arm 5, within a range of 50% of the distance $a$ between the axes of the bearing members 7′ and 8′. As shown in Fig. 1, therefore, the point of intersection 30 can lie on the vertical line or plane 29 in a range which is limited by the distances $$\frac{a}{2}$$

above or below the plane or line $b$—$b$. These distances are indicated at the lower left in Fig. 1 of the drawings.

With the suspension mechanism constructed and arranged in accordance with the foregoing, the supporting force of the spring 15 acts against any transverse force occurring during the travel of the vehicle so that the control arms 4 and 5 have only to take up very small bending moments or none at all. An advantageous construction is obtained when the helical spring 15 and the bearings 7′ and 8′ of the links 4 and 5 are supported by the king pin in such a way that the axis $y$—$y$ shown in Fig. 1, corresponding to the axis of the king pin 3, and the axis $x$—$x$ of the spring, intersect at least approximately at the center point of the ball bearing 7′ of the ball and socket joint between the king pin 3 and the upper control or suspension arm 4.

A thrust bearing 31 is provided between the bracket 10 around the king pin 3 and the upper part of the knuckle 2′ extending around the king pin. The thrust bearing 31 is provided with a cover 32 for excluding dirt and the like. Rubber buffers or bumpers 33 and 34 are provided on the body of the vehicle for limiting the movement of the wheel 1, these buffers being arranged so that they are respectively engaged by the control arms 4 and 5 during the springing of the wheel.

Figure 3:
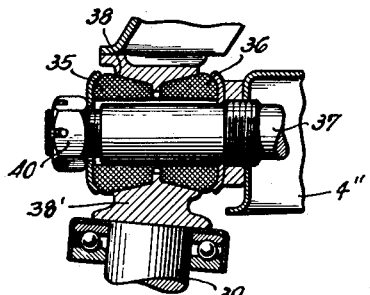
Fig. 3 is a cross-sectional view through a modified form of carrier pin construction for the suspension arms and showing the bearing structure attached to the upper suspension arm, this view being on a larger scale than those of Figs. 1 and 2.

Fig. 3 shows a modified form of bearing construction for the control arm carrier pins which differs from the construction described above, mainly by the fact that a rubber joint is provided instead of the ball and socket joint shown in Fig. 1. The joint or bearing shown in Fig. 3 is comprised of a pair of similar rubber sleeves 35 and 36 surrounding the cylindrical carrier pin 37, these sleeves bearing directly in an opening 38 in a bracket 38′ comprising the head of a king pin 39. The rubber sleeves or bearing elements 35 and 36 are tensioned and wedged toward each other by means of a nut 40 applied against a washer on the projecting end of the pin 37.

Fig. 3 shows the bearing for the upper link or control arm 4″ and it is to be understood that the bearing structure for the lower link will be the same as that shown in Fig. 3, except that means similar to that shown in Fig. 1 will be included for attaching the bearing bracket to the lower end of the king pin.

In the construction shown in Fig. 2, with the wheel removed, it will be noted that the stub axle or spindle 2 extends from a mounting plate 41 for mounting the hub and drum of the wheel, the bracket 41 being provided with threaded holes 42 for receiving the fastening studs or stud bolts.

It is to be understood that the invention is not limited to the specific constructions shown and described. Thus, for example, the carrier pins for the control arms might be arranged to engage with the knuckle directly as by means of ball and socket or other bearings so that the king pin can be eliminated and the unsprung part of the chassis may be kept very low.

What we claim is:

1. An independent wheel suspension for the steerable wheels of power driven vehicles, in which each steerable wheel is guided by similar parallel spaced upper and lower longitudinally-extending suspension arms pivoted to the body of the vehicle and swingable parallel to a vertical plane extending generally longitudinally of the vehicle and sprung by an upright helical spring, the improvement in which the axis of the spring intersects a vertical line through the geometrical center of the wheel at a point lying within a given distance range on either side of a horizontal plane through the free end of the lower suspension arm, said given distance range being 50% of the distance between the free ends of the suspension arms, whereby the helical spring counteracts transverse forces transmitted by the wheel against the wheel suspension during the travel of the vehicle.

2. A wheel suspension as claimed in claim 1, in which the helical spring and the vertically movable free ends of the suspension arms are supported on an upright king pin in such a manner that the axis of the spring and the axis of the king pin intersect at approximately the center point of the attachment between the free end of the upper arm and the king pin.

3. A wheel suspension as claimed in claim 2, including a carrier pin at the free end of each arm provided with a ball-shaped bearing member attached to the king pin, the center of the ball-shaped bearing members being located on the axis of the king pin.

4. A wheel suspension as claimed in claim 3, in which the king pin includes a socket bearing at each end, said bearings respectively receiving the ball-shaped bearing members at the free ends of the suspension arms.

5. A wheel suspension as claimed in claim 1, in which the vertically movable free end of each longitudinally-extending suspension arm is provided with a transversely extending carrier pin having a projecting ball-shaped bearing, an upright king pin having a socket bearing at each end, said ball-shaped bearings being respectively mounted in said socket bearings of the king pin, the socket bearing at the upper end of the king pin including a bracket and means for mounting the lower end of the helical spring on said bracket.

6. A wheel suspension as claimed in claim 1, including an upright king pin located between the vertically movable free ends of the longitudinally-extending suspension arms, means for pivoting the free ends of the suspension arms respectively directly to the ends of the king pin, means including a knuckle for supporting the wheel, said knuckle including a bearing surrounding the king pin intermediate the free ends of the suspension arms, and an antifriction thrust bearing at the upper end of the king pin for taking the trust of the knuckle.

7. A wheel suspension as claimed in claim 1, in which said longitudinally-extending suspension arms form the opposite sides of a parallelogram, an upright king pin located at the free ends of the arms, means including a transversely-extending carrier pin for pivoting the free ends of the arms respectively to the upper and lower ends of the king pin, the carrier pins extending respectively transversely above and below the ends of the king pin with the center of the pivots between the carrier pins and the king pin being located on the axis of the king pin, said pivoting means including resilient members surrounding the carrier pins.

8. An individual wheel suspension for the steerable wheels of power driven vehicles comprising similar parallel spaced upper and lower longitudinally-extending suspension arms one end of each of which is pivoted to the vehicle body, the other ends of the arms being free and movable vertically and the arms being swingable on their pivots parallel to a vertical plane extending generally longitudinally of the vehicle, a wheel attached to the free ends of said arms, said arms constituting the sole suspension means for said wheel, and an upright helical spring by which the movable ends of the arms are sprung with respect to the vehicle, the spring being positioned so that its axis intersects a vertical line through the geometrical center of the wheel of the vehicle at a point lying within a given distance range on either side of a horizontal plane through the free end of the lower suspension arm, said given distance range being 50% of the distance between the free ends of the suspension arms, whereby the helical spring counteracts transverse forces transmitted by the wheel against the wheel suspension during the travel of the vehicle.

References Cited in the file of this patent

UNITED STATES PATENTS

| | | |
|---|---|---|
| 2,117,588 | Armstrong | May 17, 1938 |
| 2,164,470 | Opolo | July 4, 1939 |
| 2,167,984 | Leighton | Aug. 1, 1939 |
| 2,177,934 | Britton et al. | Oct. 31, 1939 |
| 2,226,406 | Krotz | Dec. 24, 1940 |
| 2,290,923 | Wahlberg | July 28, 1942 |
| 2,403,145 | Ulrich | July 2, 1946 |